(12) United States Patent
Zander et al.

(10) Patent No.: US 9,505,438 B2
(45) Date of Patent: Nov. 29, 2016

(54) AXLE CARRIER AND METHOD FOR PRODUCING AN AXLE CARRIER

(71) Applicant: Bayerische Motoren Werke Aktiengesellschaft, Munich (DE)

(72) Inventors: Joerg Zander, Jona (DE); David Keller, Munich (DE); Markus Lotz, Sauerlach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/628,496

(22) Filed: Feb. 23, 2015

(65) Prior Publication Data
US 2015/0166105 A1    Jun. 18, 2015

Related U.S. Application Data

(63) Continuation of application No. PCT/EP2013/063934, filed on Jul. 2, 2013.

(30) Foreign Application Priority Data

Aug. 24, 2012   (DE) ........................ 10 2012 215 098

(51) Int. Cl.
*B62D 21/11* (2006.01)
*F16B 11/00* (2006.01)
*B62D 29/00* (2006.01)
*B62D 27/02* (2006.01)

(52) U.S. Cl.
CPC ............. *B62D 21/11* (2013.01); *B62D 27/026* (2013.01); *B62D 29/005* (2013.01); *F16B 11/008* (2013.01)

(58) Field of Classification Search
CPC .. B62D 21/11; B62D 29/005; B62D 27/026; B60G 2206/821; B21D 55/88; B29C 65/54; B29C 65/542; B29C 65/544; B29C 65/546
USPC .................. 156/293, 294, 305, 295; 403/268
See application file for complete search history.

(56) References Cited

U.S. PATENT DOCUMENTS 6,149,198 A   11/2000   Klaas
6,408,515 B1   6/2002   Durand
(Continued)

FOREIGN PATENT DOCUMENTS

CN    102530081 A     7/2012
DE   196 08 414 A1    9/1997
(Continued)

OTHER PUBLICATIONS

Chinese Office Action issued in counterpart Chinese Application No. 201380041543.1 dated Jan. 6, 2016 with English-language translation (eight (8) pages).

(Continued)

*Primary Examiner* — Ruth Ilan
(74) *Attorney, Agent, or Firm* — Crowell & Moring LLP

(57) ABSTRACT

An axle support for a motor vehicle includes at least one first support and at least one second support fitted onto the first support. A cavity between the first and second supports that is defined by the surfaces of the supports and circumferential sealing rings is filled with adhesive to adhere the supports to one another. One of the supports is preferably made of metal, preferably cast aluminum, and the other support is preferably made of fiber-reinforced plastic.

9 Claims, 3 Drawing Sheets

(56) References Cited

U.S. PATENT DOCUMENTS

| | | | |
|---|---|---|---|
| 2008/0102249 A1* | 5/2008 | Ristoski | B60K 15/03177 428/138 |
| 2010/0038893 A1 | 2/2010 | Stolle et al. | |
| 2013/0168939 A1 | 7/2013 | Buschjohann et al. | |
| 2013/0285372 A1* | 10/2013 | Lecointe | F16L 13/116 285/294.3 |
| 2014/0016995 A1* | 1/2014 | Wilson | F16B 11/008 403/272 |
| 2014/0117654 A1 | 5/2014 | Buschjohann et al. | |
| 2014/0183895 A1* | 7/2014 | Awano | B62D 29/005 296/29 |
| 2014/0376995 A1* | 12/2014 | Faass | F16B 11/008 403/267 |
| 2016/0137232 A1* | 5/2016 | Charest | B23K 31/02 428/586 |

FOREIGN PATENT DOCUMENTS

| | | | |
|---|---|---|---|
| DE | 198 22 731 A1 | 11/1999 | |
| DE | 10 2011 115 387 A1 | 5/2012 | |
| DE | 10 2012 011 797 A1 | 1/2013 | |
| EP | 0 146 716 B1 | 12/1988 | |
| EP | 1 690 779 A1 | 8/2006 | |
| FR | WO 2014195868 A1 * | 12/2014 | B29C 65/542 |
| WO | WO 96/32312 A1 | 10/1996 | |
| WO | WO 00/66417 A1 | 11/2000 | |

OTHER PUBLICATIONS

German Search Report dated Feb. 18, 2013 with partial English-language translation (Ten (10) pages).

International Search Report (PCT/ISA/210) dated Sep. 17, 2013 with English-language translation (Four (4) pages).

\* cited by examiner

AXLE CARRIER AND METHOD FOR PRODUCING AN AXLE CARRIER

CROSS REFERENCE TO RELATED APPLICATIONS

This application is a continuation of PCT International Application No. PCT/EP2013/063934, filed Jul. 2, 2013, which claims priority under 35 U.S.C. §119 from German Patent Application No. 10 2012 215 098.6, filed Aug. 24, 2012, the entire disclosures of which are herein expressly incorporated by reference.

BACKGROUND AND SUMMARY OF THE INVENTION

The present invention relates to an axle support for a motor vehicle as well as a method for producing the axle support.

Axle supports in motor vehicles generally have two longitudinal supports. The longitudinal supports extend substantially in the longitudinal direction of the vehicle. The two longitudinal supports are connected to one another by transverse supports. The axle support is fastened to the vehicle body. The various connecting members for suspension of the wheels are in turn fastened to the axle support. Axle supports in a motor vehicle are usually made of metal, for example aluminum.

The object of the present invention is to provide an axle support which, with cost-effective production and installation, is as lightweight as possible and ensures a low-maintenance and reliable operation of a motor vehicle. In particular the axle support should be suitable for mass production. Furthermore it is an object of the present invention to provide a corresponding method for producing the axle support.

The object is achieved by an axle support for a motor vehicle, comprising at least one first support and at least one second support fitted onto the first support. A cavity is formed between an outer surface of the first support and an inner face of the second support. This cavity is filled with adhesive. The cavity filled with adhesive secures the connection between the first support and the second support.

Thus according to the invention the two supports of the axle support are connected to one another by a method of injection adhesion. In the axle support the two longitudinal supports (first supports) are particularly preferably made of metal, in particular aluminum casting. In order to achieve a significant saving of weight, the two transverse supports (second support) which connect the two longitudinal supports to one another are made of fiber-reinforced plastic, preferably carbon fiber reinforced plastic (CFRP), for example as braided profiles. Through the construction of the cavity according to the invention which is formed with adhesive it is ensured that the two substrates do not touch. In this way corrosion at the contact point between the fiber-reinforced plastic and the metal is avoided. A coating of the longitudinal support, for example with thick layer cataphoretic paint, is provided as additional protection against corrosion.

Two sealing rings are preferably provided. The two sealing rings close the cavity, so that in injection adhesion no adhesive escapes. At the same time a defined spacing or a defined gap width can be ensured in the cavity by the two sealing rings. In particular the two sealing rings are of U-shaped construction and thus can be fitted onto the front ends of the respective supports.

A channel is preferably constructed in one of the supports. In the interior of the support this channel leads to the cavity. Adhesive can be injected into the cavity via the channel. Particularly preferably the channel is formed in one of the first supports, that is to say preferably in a support made of metal. This has the advantage that a thread can be formed at the inlet into the channel. An inlet hose for the adhesive can be screwed into this thread. Thus the thread constitutes a pressure-resistant connection between the inlet hose and the channel.

The second support made of fiber-reinforced plastic is preferably fitted onto the first support. Since the channel is preferably formed in the metal of the first support, the channel extends in the longitudinal direction of the support beyond the cavity and thus is readily accessible in the production process.

The invention further comprises a method for producing an axle support for a motor vehicle. The embodiments presented in the context of the axle support according to the invention apply correspondingly advantageously to the method according to the invention. The method comprises at least the following steps: (i) providing a first support and a second support, (ii) insertion of the two supports into one another, wherein a cavity is formed between an outer surface of the first support and an inner face of the second support, and (iii) filling of the cavity with adhesive.

Sealing rings are preferably fitted onto the ends of the two supports. As already described above, this has the advantage that the different materials of the support do not touch and at the same time a defined gap is predetermined in the cavity. During the production process a further advantage is obtained due to the sealing ring: When the sealing rings are used the two supports are fixed solely by the fitting together, so that the handling is simplified in the production process.

Bearing blocks to accommodate a gearbox can preferably be disposed in or on the second supports which are constructed as transverse supports. Depending upon the design and construction one of the bearing blocks can be disposed in the overlap region of the two adhered supports. In order to take this into consideration, a recess is preferably constructed in the first support and in the second support. A receptacle for a gearbox mounting can be inserted into this recess at a later stage. During the adhesion process a place-holder element, made for example of plastic, is inserted into the recess. This place-holder element ensures that no adhesive escapes at the edges of the recess during the initiation of the adhesive. After the initiation of the adhesive the place-holder element is removed again and a corresponding receptacle for the transmission or a bearing block can be pressed in.

The injection of the adhesive into the cavity preferably takes place with a vacuum and/or overpressure. In addition to connection of the two supports by the adhesive, it is possible to secure it for example by riveting, screws or the like. This additional securing can also be used only for fixing the position of both supports during the curing of the adhesive.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
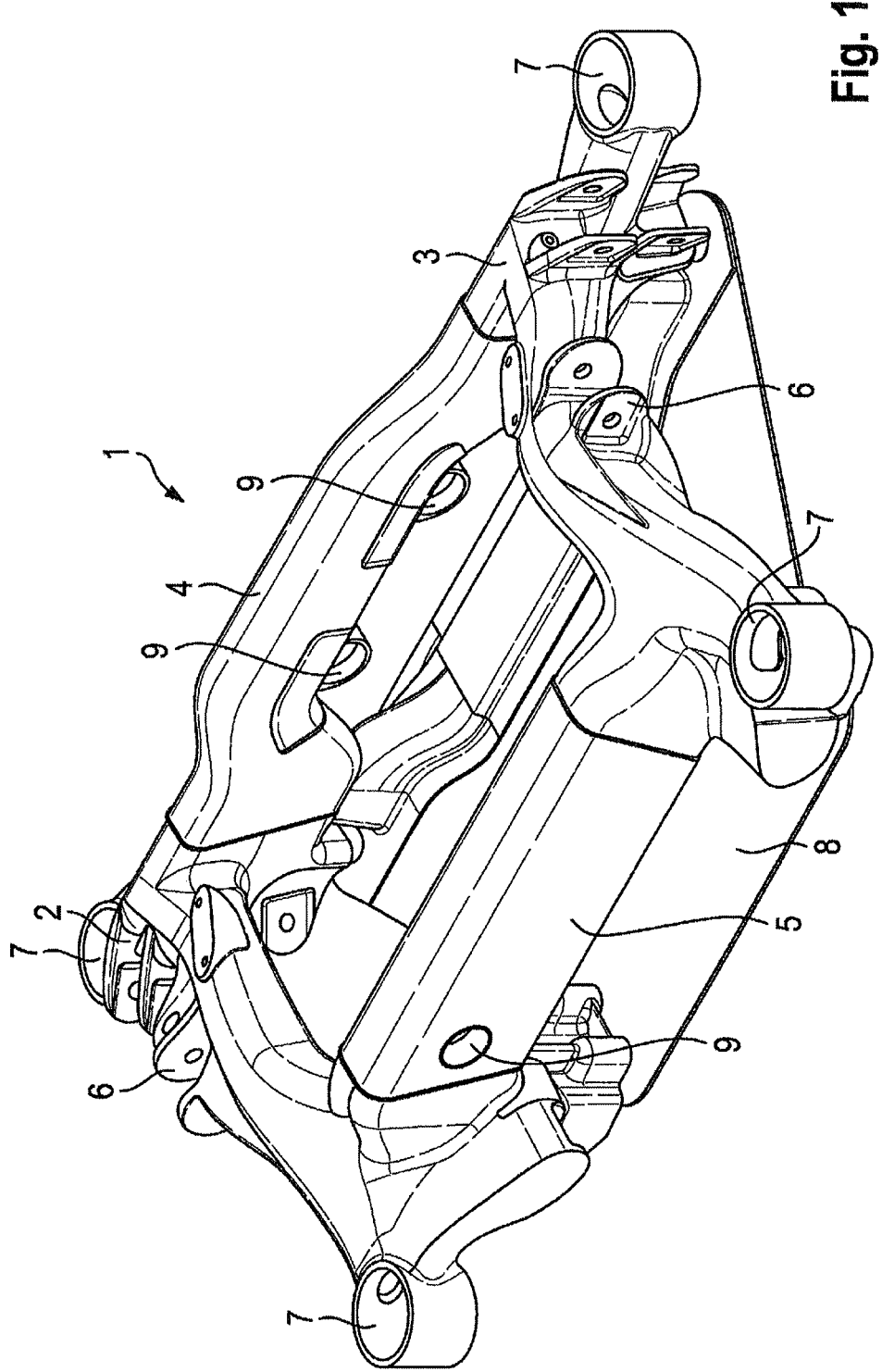
FIG. 1 shows an isometric view of an axle support according to the invention according to one embodiment.

An embodiment of an axle support 1 according to the invention is described with reference to FIGS. 1 to 5. The axle support 1 shown is designed as a rear axle support for an automobile.

The axle support 1 encompasses a left longitudinal support 2 and a right longitudinal support 3. The two longitudinal supports 2, 3 extend substantially in the longitudinal direction of the vehicle. The two longitudinal supports 2, 3 are connected by a front transverse support 4 and a rear transverse support 5. The left and right longitudinal supports 2, 3 are in each case designated as a "first support". The front and rear transverse supports 4, 5 are in each case designated as a "second support".

A shear panel 8 is provided as a further connection between the two longitudinal supports 2, 3.

A plurality of attachment points 6 for attachment of connecting members are provided on the longitudinal supports 2, 3. The wheels of the motor vehicle are in turn suspended on these connecting members. Furthermore each longitudinal support 2, 3 has two mountings 7. Bearings which fasten the axle support 1 to the sub-floor of the motor vehicle are inserted into the mountings 7.

Two bearing blocks 9 are adhered to the front transverse support 4. A further bearing block 9 is disposed in the rear transverse support 5. A rear axle transmission is suspended on the bearing blocks 9.

The two transverse supports 4, 5 (second supports) and the shear panel 8 are manufactured from carbon fiber-reinforced plastic (CFRP). The two longitudinal supports 2, 3 are made of aluminum castings.

Figure 2:
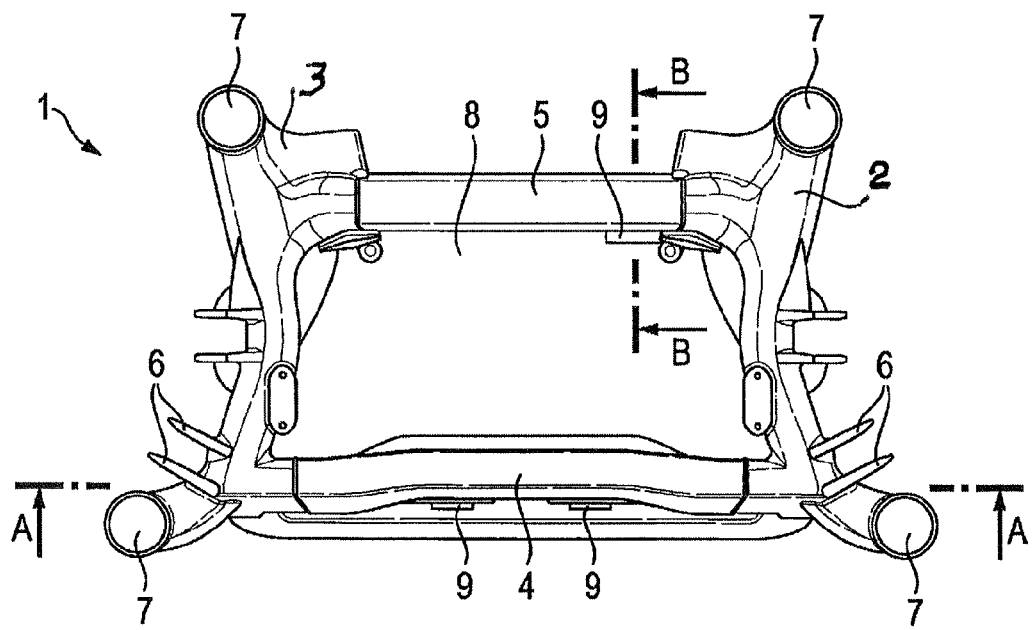
FIG. 2 shows a plan view of the axle support according to the invention according to the embodiment.
Figure 5:
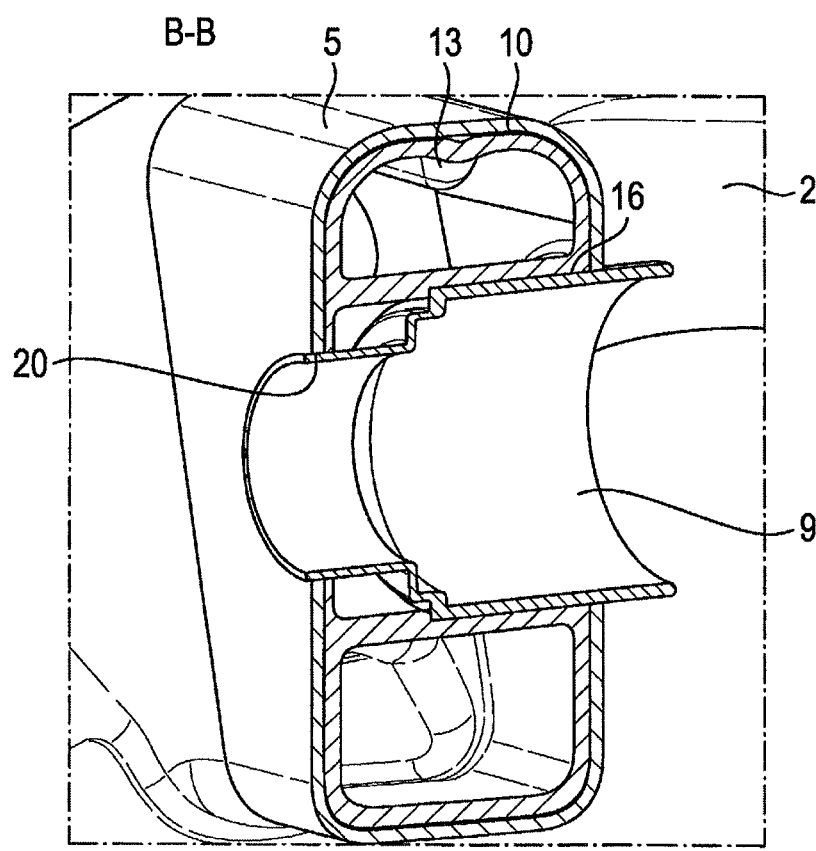
FIG. 5 shows a section B-B identified in FIG. 2

FIG. 2 shows the axles support 1 in plan view. The sections A-A and B-B are identified in FIG. 2. The sectional view relating to A-A can be found in FIG. 3. The section B-B is shown in FIG. 5.

Figure 3:
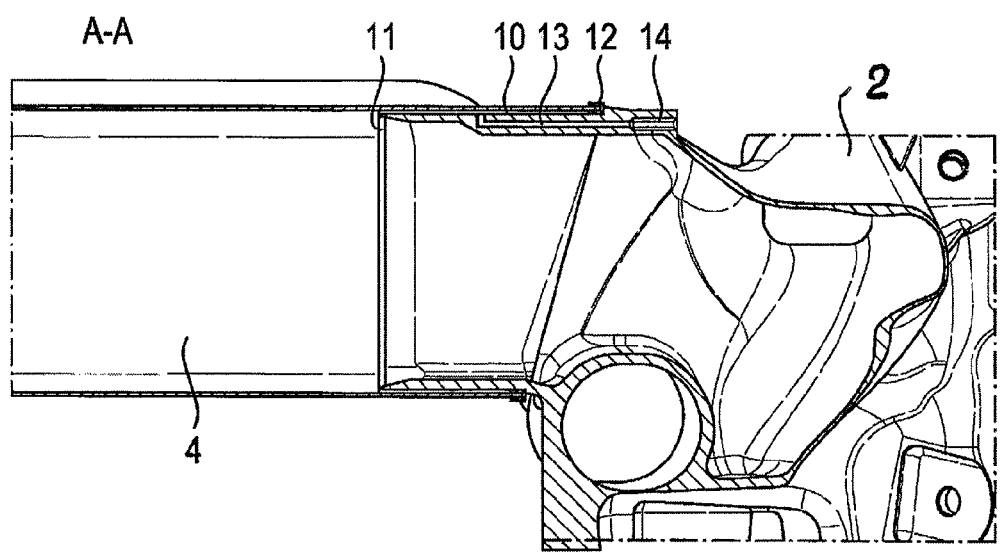
FIG. 3 shows a section A-A identified in FIG. 2.

FIG. 3 shows the section A-A identified in FIG. 2. One of the four connections between a transverse support 4, 5 and a longitudinal support 2, 3 can be seen here.

Figure 4:
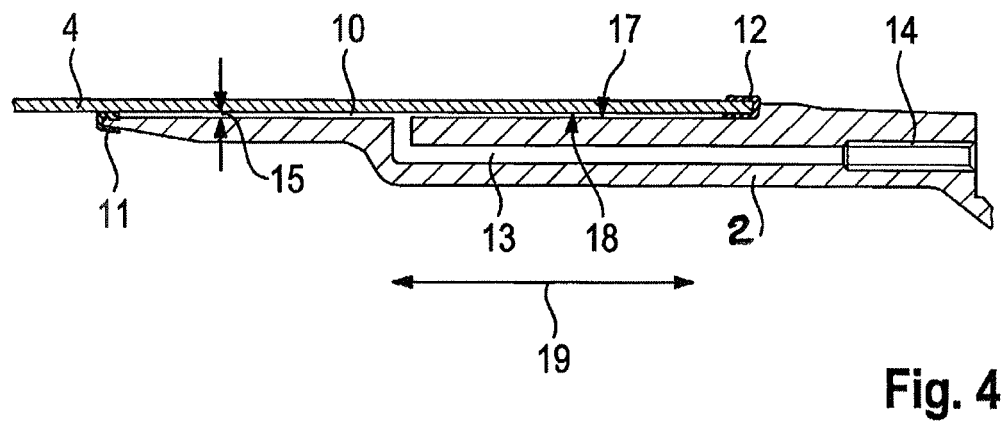
FIG. 4 shows a detail from FIG. 3.

FIG. 4 shows a detail from FIG. 3. It can be seen that the front transverse support 4 is fitted onto the left longitudinal support 2. A cavity 10 is formed between an external surface 17 on the left longitudinal support 2 and an inner surface on the front transverse support 4. The cavity 10 has a gap width 15. The gap width 15 is ensured by two sealing rings 11, 12. The first sealing ring 11 is fitted onto the end of the left longitudinal support 2. The second sealing ring 12 is fitted onto the end of the front transverse support 4. The two sealing rings 11, 12 are in each case U-shaped and thus can be fitted at the front end onto the longitudinal and transverse supports 2, 3, 4, 5.

A channel 13 is constructed in the left longitudinal support 2. Adhesive can be injected into the cavity 10 via this channel 13.

In order to ensure accessibility of the channel 13 for ease of installation, the channel 13 extends in the illustrated longitudinal direction 19 beyond the cavity 10. A thread 14 is formed on the end of the channel 13. An inlet hose for the adhesive can be screwed into this thread 14. Thus by the thread 14 a secure connection can be produced between the inlet hose and the channel 13 for application of pressure to the adhesive.

The gap width 15 shown is preferably between 0.5 and 5 mm, so that on the one hand a stable adhesion is possible and on the other hand sufficiently elasticity is also ensured by the thickness of the adhesive.

The method of injection adhesion explained with reference to FIGS. 3 and 4 is applied to all four connection points between the longitudinal supports 2, 3 and transverse supports 4, 5 of the illustrated axle support 1.

In addition to the sealing rings 11, 12, spacer lugs can be formed on the outer surface 17 and/or inner surface 18. These spacer lugs ensure the gap width 15. The spacer lugs are in particular disposed so that the adhesive can be sprayed completely around them in order thus to avoid corrosion.

FIG. 5 shows the section B-B identified in FIG. 2. With reference to FIG. 5 it can be seen that one of the bearing blocks 9 is located in the overlap region of the rear transverse support 5 and the left longitudinal support 2. In this case the bearing block 9 is inserted in a recess 20. The recess 20 extends in alignment through the rear transverse support 5 and the left longitudinal support 2. During the filling of the cavity 10 with the adhesive a place-holder element is employed instead of the illustrated bearing block 9. This place-holder element ensures that no adhesive escapes at the edges of the recess 20. After the injection of the adhesive the place-holder element is removed and the illustrated bearing block 9 is pressed in, so that a press fit 16 is formed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 1 axle support
2 left longitudinal support
3 right longitudinal support
4 front transverse support
5 rear transverse support
6 attachment point
7 mounting
8 shear panel
9 bearing blocks
10 hollow space
11 first sealing ring
12 second sealing ring
13 channel
14 thread
15 gap width
16 press fit
17 outer surface
18 inner surface
19 longitudinal direction
20 recess

What is claimed is:

1. An axle support for a motor vehicle, comprising:
at least one first support;
at least one second support;
an adhesive; and
two circumferential sealing rings,
wherein each of the at least one second support is fitted onto a corresponding one of the at least one first support, one of the at least one first support and the at least one second support is made of metal and the other of the at least one first support and the at least one second support is made of fiber-reinforced plastic, the adhesive fills a cavity delimited by an outer surface of the at least one first support, an inner surface of the at least one second support and the two circumferential sealing rings.

2. The axle support according to claim 1, wherein the metal is cast aluminum.

3. The axle support according to claim 1, wherein the two circumferential sealing rings are configured to keep the at least one first support and the at least one second support spaced apart.

4. The axle support according to claim 3, wherein a channel for injection of the adhesive into the cavity is formed in at least one of the first and second supports.

5. The axle support according to claim 4, wherein the channel extends beyond the cavity in a longitudinal direction of the support containing the channel.

6. The axle support according to claim 5, wherein the at least one first support is two first supports disposed as longitudinal supports of the axle support, the at least one second support is two second supports disposed as transverse supports of the axle support, and the two longitudinal supports are made of metal and the two transverse supports are made of fiber-reinforced plastic.

7. A method for producing an axle support for a motor vehicle, comprising the acts of:

providing a first support and a second support, wherein one of the first and second supports is made of metal and the other one of the first and second supports is made of fiber-reinforced plastic;

fitting a first circumferential sealing ring onto one end of the first support, and fitting a second circumferential sealing ring onto one end of the second support;

inserting the first support into the second support such that a cavity is formed between an outer surface of the first support, an inner surface of the second support and the two circumferential sealing rings; and filling the cavity with an adhesive.

8. The method according to claim 7, wherein the metal is cast aluminum.

9. The method according to claim 7, further comprising the acts of:

inserting a place-holder element configured to conduct the adhesive to the cavity into an aligned recess formed in the first and second supports prior to the act of filling the cavity with the adhesive; and removing the place-holder element from the aligned recess after the act of filling the cavity with the adhesive.

* * * * *